Patented Aug. 4, 1942

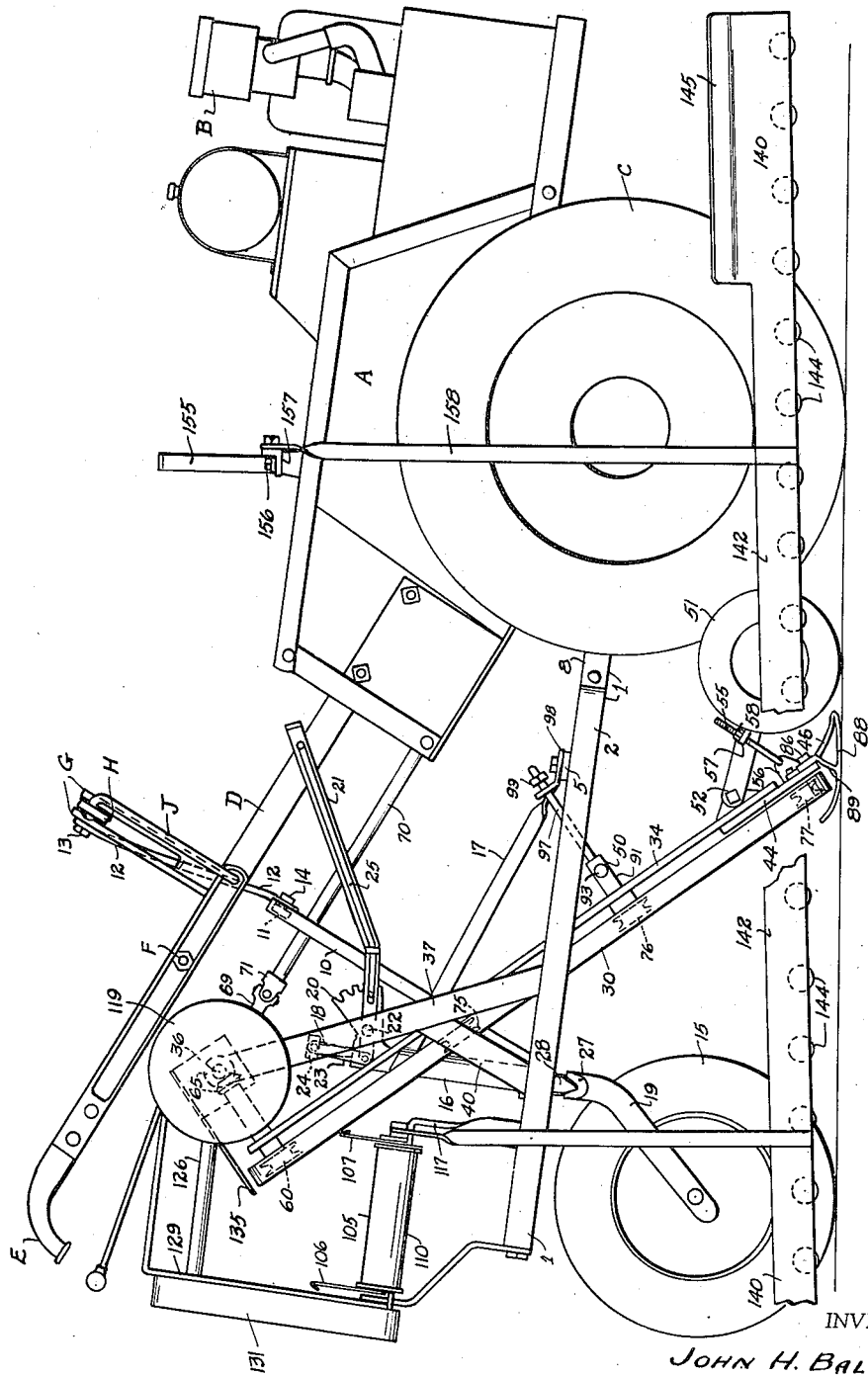

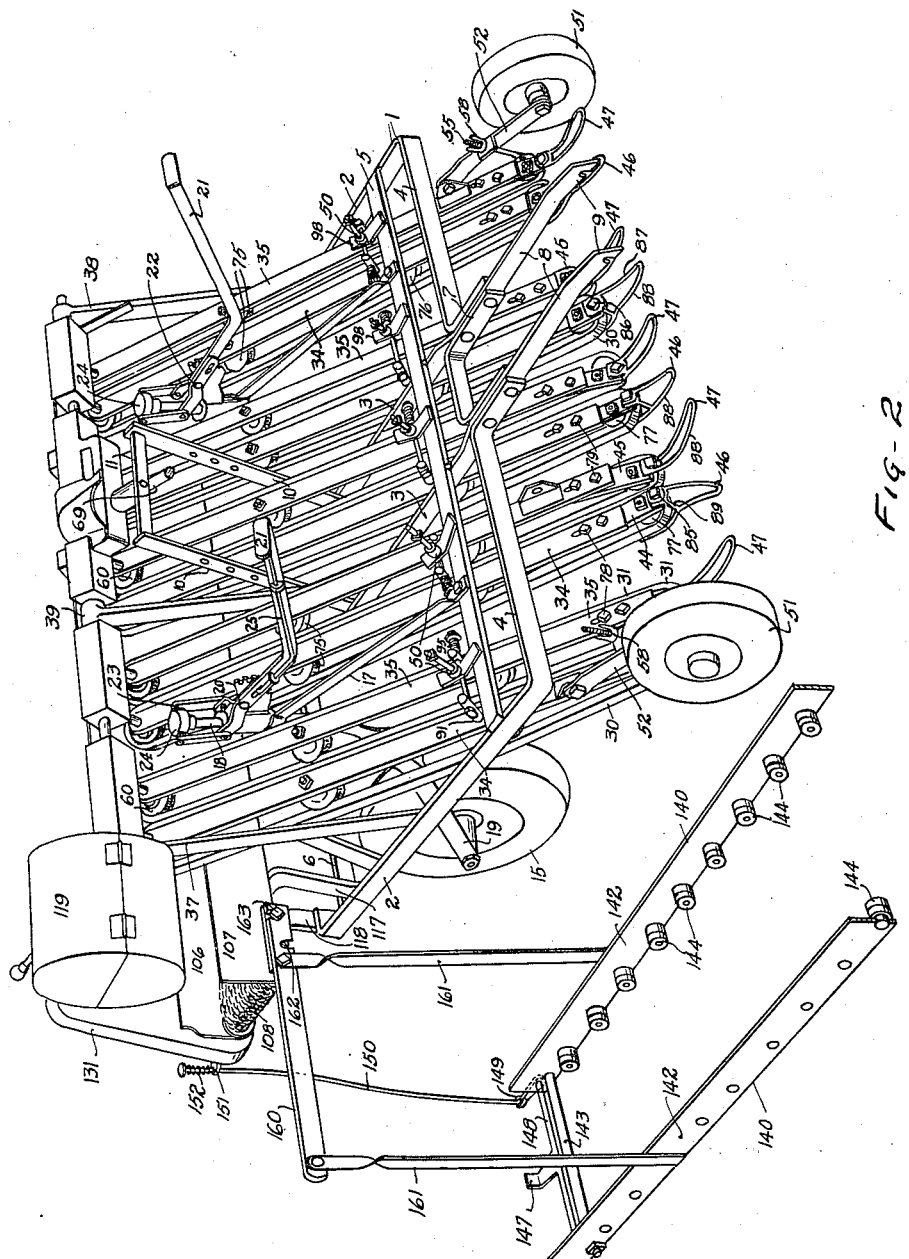

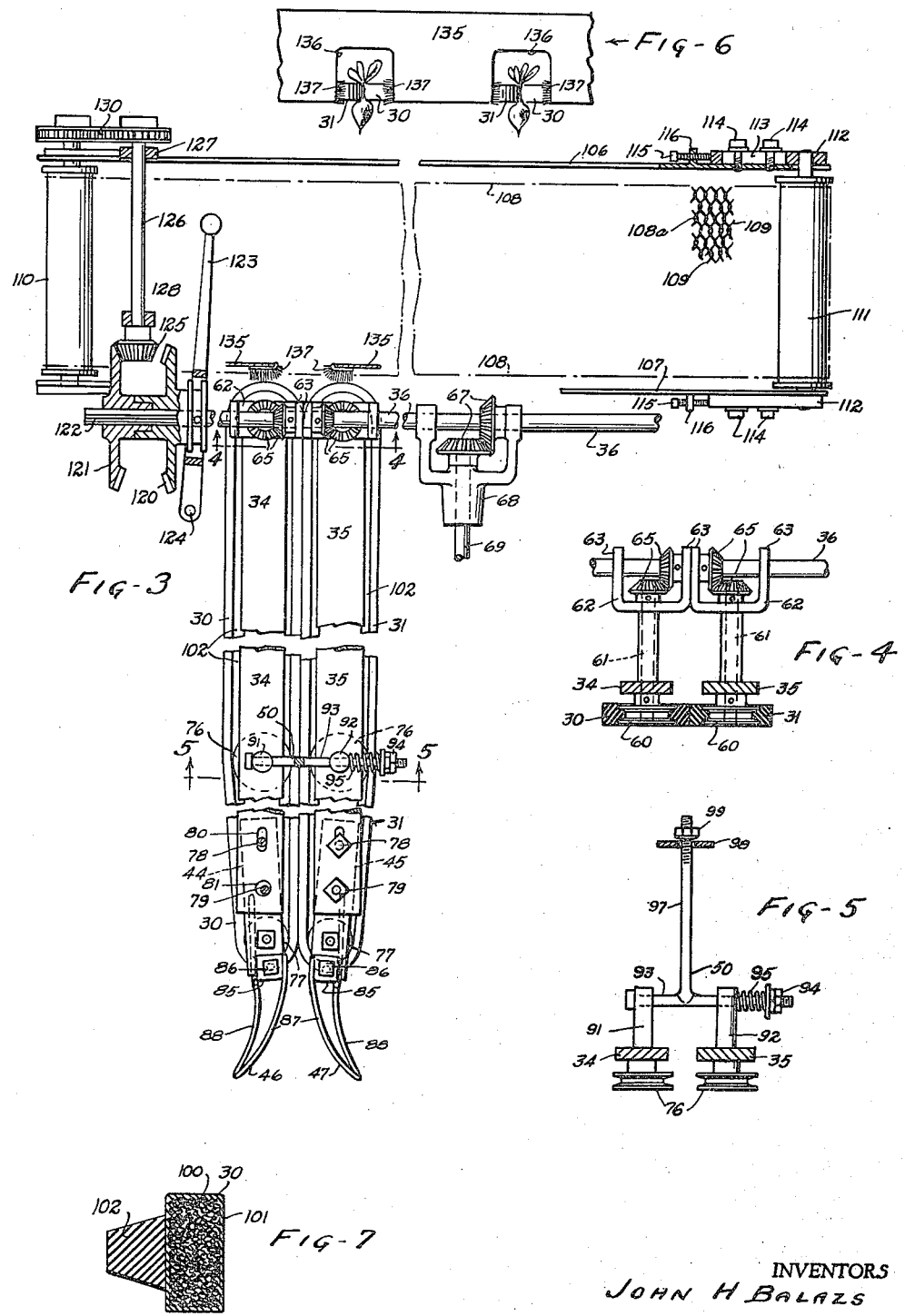

2,291,784

UNITED STATES PATENT OFFICE 2,291,784

HARVESTER IMPLEMENT

John H. Balazs, Cleveland, and Ralph F. Bott, Bay Village, Ohio; said Bott assignor to said Balazs Application July 17, 1940, Serial No. 345,948

15 Claims. (Cl. 55—66)

This invention relates to a harvesting implement for pulling from the earth root crop plants such as radishes, freeing the plants from loose earth, collecting the plants or at least the root portions thereof in suitable containers and depositing the containers on the ground in positions remote from the plants which are still to be harvested. This indicates the general object.

A further object is to provide a harvesting implement for root crops which will operate efficiently to pull root crop plants having relatively tender stalk or stem structures above ground without danger of crushing or weakening said structures to such an extent as to cause the same to be pulled apart or damaged, thus failing to pull the roots and/or preserve the plants in the desired undamaged condition.

Another object is to provide a root-crop plant puller which is capable of being easily adjusted for pulling different types of plants from a variety of types of soils and from rows which are variously spaced apart.

Other objects are: to provide an improved type of plant gripping and pulling element for implements adapted to operate continuously as moved along a row or rows of plants; an improved mounting or suspension for such elements; a novel and effective arrangement for gathering the stalk and leaf, i. e. "top," portions of plants prior to pulling; a novel and effective device for discharging plants from between puller and conveyer belts; an improved gang driving arrangement for plant pullers and conveyers; a novel lateral conveyer and dirt remover for loose plants, and a novel means for supplying containers such as crates or boxes into plant receiving positions and for ejecting the containers from carrying positions when filled.

Still another object is to provide a support for plant puller belts on which the belts can be easily and quickly mounted in the field for replacement when worn and which support can be easily adjusted as desired for belt tension and gripping force variation as to the plants to be pulled.

Other objects include the provision of a supporting means for implements such as shown and by which such implements can be raised and lowered bodily with respect to the ground and properly and easily handled both when working and not working, and, specifically, a novel crop puller and tractor combination including particularly a two wheeled truck-farm tractor of a known type.

The arrangement illustrated in the drawings is especially adapted and arranged for pulling radishes, but the principles are applicable to the harvesting of many other crop plants and for weeding or thinning of crops.

In the drawings, Fig. 1 is a side elevation showing, at the left, one form of implement in accordance with the invention hitched to a power driven tractor, the latter being shown at the right; Fig. 2 is a fragmentary perspective view of the implement; Fig. 3 is a sectional plan view showing one set of puller belt supports and belts and, more or less diagrammatically, a lateral conveyer and driving mechanism for the pullers and conveyer, together with other features; Figs. 4 and 5 are sectional detail views taken as indicated at 4—4 and 5—5 on Fig. 3; Fig. 6 is a detail rear elevational view showing portions of two pairs of puller belts and a combined plant ejector and belt cleaning means provided principally to insure the disengagement of the plants from the belts at the desired discharge points in the event they have a tendency to adhere to the puller belts, and Fig. 7 is a cross-sectional view of a preferred form of puller belting.

In Fig. 1, the various portions of the tractor are indicated by letters. A is the tractor body, B, a power unit, C, one of a pair of traction wheels, D, one of a pair of fixed handle supporting bars, E, one of a pair of handles which are pivoted to the bars D, as at F, and G, a rigid arched cross member connecting the rigid bars D and supporting a centrally pivoted cross arm H to the ends of which the pivoted handles E are attached as by links, one of which is shown at J. The tractor shown is arranged to be steered in a known manner by swinging of the handles E about their pivots. Such a tractor is fully illustrated and described in the publication "Planet Jr. Tractors" published by S. L. Allen & Company, Inc., Philadelphia, Pa. (copyright 1939), wherefore the tractor needs no detailed illustration here. The connections of the puller implement with the tractor will be described below.

Referring to Figs. 1 and 2, a generally rectangular open frame 1 for the implement may be constructed with longitudinal side sills 2, laterally spaced center sills 3, forward cross members 4 and 5 and one or more rear cross members 6. The central sills 3 extend from the cross member or members 6 longitudinally past a U-shaped connecting piece 7 for forwardly extending arm portions 8 of the cross members 4, and then beyond said portions so as to serve as drag arms for the implement. The hooked ends 9 (Fig. 2 only) of the central sill extensions cooperate with fastening means on the tractor, for example as shown and described on pages 7 and 27 of the publication identified above. Additionally the frame 1 has, connected to the sill members 3, an upwardly extending framework 10 with a cross piece 11, which latter, as illustrated in Fig. 1 only, is secured to the arched cross member G of the tractor handle assembly as by a substantially rigid link 12. The link is pivoted at its opposite ends to the members G and 11, respectively, as at 13 and 14, allowing some relative movement laterally of the tractor and implement while, in cooperation with the forward drag arm hitch, holding the two machines together for unitary operation. The various fixed members of the frame 1 are preferably welded together, but bolts, rivets, or other fastening means can be used instead or in part.

The frame 1 is arranged to be supported by a pair of large caster type wheel assemblies for pneumatically tired wheels 15, one only of which is clearly shown. The caster supports comprise upstanding tubular heads 16 secured by appropriate brackets and brace bars (e. g. parts 17) to the frame 1, in which heads the spindles 18 of caster forks 19 are swiveled and slidably mounted. For raising and lowering the implement the upper ends of the heads 16 have mounted, rigidly thereon, respective toothed adjustment sectors 20 for elevating levers 21. The levers are pivoted to the heads or sectors as at 22 and have paired links 23 connecting their rearward yoked ends to enlarged heads 24 surmounting the caster fork spindles. Rods 25 on the levers 21 have rear end portions engageable with the sector teeth and, when the implement is lowered into working position by the levers (position shown in Fig. 1), the spindles are locked automatically against swivelling. The locking means may, for example, comprise sockets 27 on the caster forks (one only shown), engageable by downwardly extending pins 28 fixed to the supporting heads 16 or some rigid portion of the frame 1. Thus, when turning corners at the ends of rows of plants, and at other times, the implement trails readily because of the caster action of the supporting wheels, but, when following the tractor along the rows, side swaying of the implement is prevented by the interlock at 27, 28.

The pulling elements, as shown, are downwardly and forwardly inclined flexible belt couples 30, 31 mounted, e. g. on rollers, carried by swingable frames which comprise, principally, longitudinally extending rigid bars 34, 35. The pulling elements, supports and driving means will be more fully described below, but for the present it is to be noted that the upper rear ends of the bars 34, 35 pivot about a horizontal drive shaft 36 and the shaft is turnably mounted in upper bearing heads of brackets 37 and 38 rising from and rigid with the frame sills 2 and a more or less central bracket 39 rigid with one of the central sills 3. The brackets may have diagonal struts or braces, one of such as shown at 40, Fig. 1, connected to respective sills. The brackets can be additionally cross-connected and braced and the parts welded together and to the main frame members which support them or secured by other appropriate means, e. g. bolts.

At the forward ends of the belt supporting bars 34, 35 are adjustable extension bar members 44 and 45, and these carry, respectively, right and left combined plant-guide and supporting shoe members 46 and 47, runner portions 88 of which ride on or in the ground in the working position of the belt carriers, for example as shown in Fig. 1. The lower end portions of the belt couples and their supporting frame assemblies are maintained in position laterally of the implement by centering and pulling-belt-pressure-controlling devices 50, the preferred construction of which (Fig. 5) will be described later.

Additional supports for the pulling-belt-carrying frames at their lower ends may comprise wheels 51 (one for each of said frames), the wheels being supported for vertical adjustment on the bars 34 or 35 on forwardly extending arms 52 demountably pivoted as on brackets 53 on said bars 34 or 35. The wheels 51 are preferably pneumatically tired and their arms 52 are adjustably restrained against movement upwardly by rods 55, thereby additionally governing the depth to which the shoes 46 and 47 can sink into soft earth. The rods 55 are attached to respective ears 56 on the bar extensions 44 or 45 and extend upwardly through apertured ears 57 on the respective arms 52, and the upper ends of the rods carry nuts 58, such as wing nuts, normally bearing downwardly on the ears 57. Each of the belt couple frame asemblies has the depth governing wheel arrangements just described, although, in the general view (Fig. 2), only the laterally outermost frame assemblies are shown so equipped. If the ground is fairly firm, then the depth governing wheel assemblies are disconnected from their brackets 52. If there are dead furrows between the rows (resulting from cultivation), then the wheels 51 can be left on in order to assist in aligning the bight of the belts 30, 31 with the plant "tops." Their principal function, however, is to assist the shoe runners 46 in supporting the belt mountings, thus assuring that the belts will not plow into the earth and grasp more than the tops of the plants. This is usually necessary only in muck land. Plowing in of the belts results in unnecessary abrasion of the belts by the earth or stones, etc. buried therein.

The belts are supported on an appropriate number of guiding sheaves or pulleys including paired driving pulleys 60 (see Fig. 4) beneath the upper ends of the bars 34 and 35, one for each belt of each belt couple. The pulleys 60 are supported on depending drive shafts 61 (cf. Figs. 3 and 4) on brackets 62 having tubular extensions which receive the shafts, the brackets being secured to the respective bars 34 and 35 and slung from the horizontal shaft 36 as on paired bracket arms 63. The arms have aligned openings riding said shaft so that the brackets 62 can pivot individually about the shaft 36, wherefore the bars 34 and 35 can also swing individually in vertical planes. Bevel gear couples 65 pinned or otherwise fixed to respective shafts 36 and 61 connect the horizontal shaft 36 with the pulleys 60 so that the latter are driven in opposite directions. The horizontal shaft 36, in turn, is driven by a bevel gear couple 67 mounted between arms of a bracket 68 which carries a forwardly reaching stub shaft 69 which is rigid with one of the gears of the last mentioned gear couple. The stub shaft is arranged to be turned by an extension 70 of a power-take-off (not shown) on the tractor, and there are means (not shown) to render the shaft idle and active at the will of the operator. A universal joint 71 connects the shaft 70 with shaft 69 and the latter shafts are turned by the power unit at such speed and direction that the adjacent stretches of the belts move rearwardly and upwardly approximately at the relative speed of the implement and the earth. The bracket 68 can be secured to the main framework of the implement in any suitable manner (not shown).

By reference to Figs. 3 and 4, it can be seen that the bars 34 and 35 are enabled to pivot or swing laterally about the axes of the shafts 61 as well as in vertical planes about the axis of the shaft 36. The latter swinging movement allows the shoe members to follow the ground directly adjacent thereto, except as restrained by the devices 50 (as will be explained presently), and the lateral pivoting enables the lower ends of the bar assemblies 34, 44 and 34, 45 to move toward and away from each other, thus accommodating thin and thick plant top growths, and enabling the gripping pressure on the plant tops to be adjusted by means associated with said bar assemblies. The lateral pivoting also enables the active ends of the plant puller belt couples to be variously spaced within predetermined short ranges.

The belt guides, in addition to the driving pulleys 60, comprise oppositely positioned sheaves in pairs at 75, 76 and 77. The sheaves 75 and 76 are carried by appropriate stub axles on the bars 34 and 35 and the sheaves 77 by stub axles on the bar extensions 44 and 45. All the sheaves 75, 76 and 77 preferably have bronze bushing bearings on their supporting axles or stubs.

The extensions 44 and 45 of the bars 34 and 35 are adjustable lengthwise and swingably on the bars 34 and 35 by clamping bolts or studs 78 and 79, the openings for which in one of the bar elements are elongated or at least larger than said bolts or studs. Fig. 3 shows one opening, 80 in the bar 34, elongated, and the other opening, 81 in bar 34, larger than the bolt or stud 79 received thereby in all directions. This enables the extensions 44 and 45 to be swung somewhat relative to the main bars 34 and 35 which support them, i. e. allowing tension adjustment for the belts and localized pressure adjustment in the region of the sheaves 77 which guide the lower end portions of the belt loops (the bight portions). All the sheaves and pulleys may be the same size, but as shown, the sheaves 77 are smaller than the others.

The manner in which the plant tops are guided by the shoe elements 46 and 47 into the grip of the belts will be clear from comparison of Figs. 1, 2 and 3. The shoes have attaching blocks 85, each fastened by a single bolt or stud 86 to the respective bar extension member 44 or 45 carrying the same. This enables swingable adjustment of the shoes in planes parallel to the principal planes of the belt loops, as for obtaining wide and narrow throat effects between the forward portions of the shoe elements. The shoe elements are essentially identical (rights and lefts) and each has an upper rod or bar portion 87 rigid with the block 85 as by being welded thereto, and which curves outwardly, and a similar lower skid portion 88 which is continued rearwardly beneath the lowermost portion of the adjacent belt so as to serve both as belt guard and supporting runner. The skid portion is braced from the block 85 by a nearly vertical strut 89. The portions 87, 88 and 89 of the shoe elements 46 and 47 may be round bar stock and all the joints are preferably welded. Because of the open formation and shape illustrated, the shoe elements are unlikely to become clogged with earth; they do not offer much resistance to forward movement, even when partly buried in soft earth, and they very effectively guard the belts against being damaged.

The belt-mounting-centering and belt-pressure-control devices 50, previously mentioned, may comprise upstanding studs or posts 91 and 92 on the bars 34 and 35, respectively, (see Figs. 1, 3 and 5) having horizontal aligned holes which slidably receive bolts or cross bars 93 having heads adjacent (e. g.) the posts 91 and each having a threaded adjusting nut 94 (or pair thereof, for locking) beyond (e. g.) the respective posts 92. The adjustment nut of each device compresses a spring 95 against the post 92, thus governing the pressure of the adjacent belt passes against each other in the regions of the sheave couples. Approximately midway between the two posts, each horizontal bar 93 has a rigid upstanding rod or bar 97 which passes through a clip 98 on a fixed cross portion of the frame (member 5 as shown). The upper end of each upstanding rod 97 has a nut 99 adjustable thereon for limiting the downward swinging movement of the belt mounting bars as a unit, the limiting force thus being equalized by the devices 50 when suspending the belt mounting units of the various belt couples. The devices 50 can also be used to position the plant gripping ends of the belt couples various distances apart, simply by fastening the clips 98 at various positions along the cross frame bar 5 as at selected ones of a plurality of fastener-receiving holes therealong; but, since the rows of plants are usually spaced by a gang planter, such lateral adjustment is usually unnecessary in actual practice.

If it is desired to use less than all of the pulling belt couple units at any one time, certain ones can be suspended in inactive position by placing sleeves (not shown) on the fixed upstanding rods 97 between the nuts 99 and the clips 98.

The preferred construction of the puller belts 30 and 31 is illustrated principally in Fig. 7. The belting comprises a strip of sponge rubber 100 with the imperforate skin thereon as at 101 on all sides together with a solid rubber driving and supporting strip 102 (integrally molded or formed with the portion 100), the two portions 100 and 102 being coextensive. The strips 100 and 102 can be molded in endless form or made in indefinite lengths as by extrusion, and the ends of cut sections of the desired length appropriately joined, preferably by a vulcanization process. The strip portions 100 and 102 may be separately made and vulcanized together so that said portions of the resulting belt constitute one integral piece of rubber. Any suitable reinforcement may be included in the construction of either portions 100 or 102 of the belts, such being especially desirable for adding tensile strength in respect to the portions 102.

In Fig. 1 it will be noted that the sheaves and driving pulleys underhang the supporting bars without additional support therebelow, wherefore the belts can easily be changed when worn. The belts are sufficiently elastic to enable them to be stretched over the sheave flanges.

Any and all of the rotating parts of the machine can have provision for lubrication, for instance, grease nipples conventionally arranged and accessible to the operator at all times.

The plants when elevated by the belts 30 and 31 drop onto a lateral conveyor 105 and are carried thereby to one side or the other of the implement where they drop into containers (crates or boxes) supported on roller equipped rearwardly inclined tracks 140 on which the crates or boxes ride into receiving position by gravity. Provision is made to drive the conveyor 105 in either direction laterally of the implement, so that the loaded containers will be deposited, as will be described below, on the cleared ground rather than on the growing crop.

The conveyor 105 is below the discharge portions of the belts 30 and 31 as indicated on Figs. 1 and 2. In Fig. 3 the conveyor is offset out of its true position (toward the top of the sheet) for clearness of illustration. A general framework for the conveyor may comprise side plates or bars 106 and 107 of adequate strength between which moves an upper pass of a continuous belt 108 of open wire link construction. A small portion of the belt is shown at 108a in Fig. 3, the construction being, for example, kinked strands of wire 109 linked loosely into mutual engagement.

Supporting rollers 110 and 111 for the end portions of the belt are rotatably carried on shafts which enter bearing blocks connected to the side plates 106 and 107. The blocks 112 for the shaft of the roller 111 (Fig. 3) are horizontally adjustable on the supporting plates for varying the tension of the conveyor belt. In the detail showing at the upper right (Fig. 3) the block 112 has a slot 113 through which clamping bolts 114 extend into the adjacent side plate 106. A set screw 115 mounted in a fixed ear 116 cooperates with the bolts 114 in effecting and maintaining the adjustment. The conveyer framework including the plates 106 and 107 can be supported from the main frame 1 by appropriate upstanding brackets such as shown at 117 and 118 at each end of the conveyer frame.

For driving the conveyer belt 108, selectively in opposite directions, a reversing gearing is mounted at one end portion of the cross shaft 36 (at left, Fig. 3), and as indicated in Figs. 1 and 2 is contained in a suitable gear box or housing 119. The other portions of the drive gearing, incidentally, are similarly housed, as will be obvious from Fig. 2 without description. The reversing gearing comprises two mutually rigid bevel gears 120 and 121 arranged to slide on the shaft 36 as at a spline 122 thereon. A shift lever 123 is pivoted at 124 as on a rigid portion of the housing 119 and operates the gear 120, 121 to shift the teeth of the gear elements selectively into mesh with a gear 125 on a shaft 126 which is constantly drivingly connected with the conveyer belt roller 110. The gear 125 is mounted above the conveyor as on a rigid bracket or pair of brackets provided with bearing portions 127 and 128 for the shaft. As shown in Fig. 1, the bracket arrangement may comprise a member 129 of inverted L shape, with an upper portion overhanging the shaft 126 and a lower portion attached to the rearward side plate structure of the conveyer frame. The shaft 126 and a rearward extension of the shaft of the roller 110 are connected by a sprocket chain assembly 130 (see Fig. 3) which is housed in a case 131 (Figs. 1 and 2). In the position of the gear member 120, 121 shown in Fig. 3 the belt is driven to the right, that is, toward the left side of the implement as faced by an operator. As the plants are dropped on the open mesh structure of the belt and are conveyer by the belt, the loosened dirt falls through the interstices of the belt so that it is not conveyed to the receiving containers on the carriers 140.

To prevent the plants from following one or the other of the flexible pulling belts 30 and 31, in case the plants stick to the belts, an ejector device is provided at the discharge region of each belt couple. As shown, a plate 135 supported on the guard boxes along the shaft 36 overhangs the belts 30 and 31 in the relation thereto shown particularly in Figs. 1 and 6. The plate has notched openings 136 through which the plants pass on their way to the lateral conveyor 105 and the side edge portions of the plate 135 defining the openings may be used to knock off the plants, as by being positioned nearly in scraping relation to the rearmost portions of the belts. Alternatively, said edge portions may be equipped with brush bristle elements 137, as shown in Figs. 3 and 6, so as to clear the belts of adhering plants and also brush off the dirt which may adhere to the belts. The provision of brush bristles and disposal of the plate 135 more remotely of the belts 30 and 31 result in less likelihood of damaging the belts in case stones and the like adhere to the belts so as to tend to become wedged between the belts and the ejector plate.

The rearwardly inclined carriers 140 for the receiving containers for the plants are similarly supported at each side of the implement, and as these may be exactly alike, only one carrier is illustrated. The carrier frames are upright parallel plates 142 with their inner broad faces spaced apart slightly wider than would be necessary to receive the crates (not shown) between them, and rigid cross members, one of which is shown at 143, holding the plates in spaced relationship. At their inner faces the plates 142 carry freely turnable rollers 144 on which the crates ride from front to rear. The crates may be placed on the carriers at outwardly flared guide flange portions near the forward ends of the plates (one flange only shown at 145), and, when the first of a series of crates reaches a position in which it is below the end portion of the lateral conveyor 105, it is stopped by a movable abutment arm 147 having an upturned end, as shown in Fig. 1, carried on a rock shaft 148 journaled in the side plates 142. When the crate is filled, the upturned end of the abutment arm 147 is moved downwardly by the operator through suitable release mechanism. As shown, the rock shaft 148 has an arm 149 inwardly toward the implement and this is controlled by a vertical rod 150 slidably attached as on the lateral conveyor frame at an ear or spring clip 151. A spring 152 between the ear 151 and the enlarged upper end of the rod normally holds the rod raised. Depression of the rod results in removal of the upturned end of the arm from its blocking relation to the filled crate; the crate rolls rearwardly and is finally dragged off the carrier by the ground and the released abutment arm stops the next crate until the latter is filled.

The carriers 140 can conveniently be supported on cantilever hangers from the tractor and implement frame. The front end portions of the carriers are suspended from a suitable braced bridge structure 155 surmounting the tractor body A and attached thereto as by readily removable bolts, one of which is shown at 156. A lower cross member 157 of the bridge projects beyond the tractor at each side and the carrier plates 142 are suspended from the cross member as by hanger straps, one of which is shown at 158. The rear portions of the carrier (Fig. 2) are supported by lateral arms 160 (one shown)

and hanger straps 161 depending therefrom. The arms 160 have quick detachable connections with the implement frame as by the provision of horizontally spaced bolts 162 and 163 with heads spaced outwardly from their supports, and respective slots in the arm, the inner one of which slots is open upwardly and the outer one downwardly. The head of the bolt 162 is omitted from the showing. In a tilted position of the arm 160 the same can be hooked onto the projecting bolts as by first engaging the shank of the bolt 163 and then swinging the outer end of the arm downwardly to engage the outer slot with the shank of the bolt 162.

If desired, cutting devices of suitable form may be arranged adjacent the pulling belts 30 and 31 so that only the root portions of the plants are delivered to the containers on the carriers 140.

It will be seen that the various objects earlier set forth herein are attained in a relatively simple and very effective manner by the embodiment of the invention shown and described above.

We claim:

1. A plant harvester comprising a frame adapted to be moved forwardly over a crop to be harvested, a pair of flexible endless belts on the frame in a common plane inclined upwardly and rearwardly relative to the crop and arranged to engage top portions of such crop so as to pull and elevate the crop; characterized by the provision of rigid guides for the belts, the upper rearward end portion of each rigid guide being pivotally mounted on the frame for movement in said common plane of the belts and for movement in substantially vertical planes extending longitudinally of the direction of movement of the harvester.

2. A plant harvester comprising a frame adapted to be moved forwardly over a crop to be harvested, a pair of elastic endless belts on the frame in a common plane inclined upwardly and rearwardly relative to the crop and arranged to engage top portions of such crop so as to pull and elevate the crop; characterized by the provision of rigid guides for the belts pivotally mounted on the frame for movement in said common plane of the belts and for movement in substantially vertical planes extending longitudinally of the direction of movement of the harvester, and means guidingly connected to the frame for movement in a substantially vertical plane, said means being connected to both rigid guides so that said means connects the guides to the frame and holds the guides with their belts in alignment with the row of plants to be harvested while permitting the pivotal movement in such substantially vertical planes.

3. A plant harvester comprising a rigid frame, a pair of flexible belts, elongated members pivoted on the frame for movement in respective vertical planes and movement in planes parallel to the principal planes of the belts, rollers spaced apart along said members for guiding the belts for longitudinal continuous movement in contact with each other, means for driving the belts, a horizontal bar connecting the members and slidable relative to one of the members, means connected to the bar for forcing the members toward each other and a bar extending upwardly from the horizontal bar at a point intermediate the points of connection of the horizontal bar with said members and slidably connected to the rigid frame.

4. A plant harvester comprising a frame adapted to be moved over a crop to be harvested, a horizontal drive shaft on the frame, a set of sub-frames pivotally mounted on the drive shaft and extending forwardly and downwardly therefrom into proximity with such crop, grooved drive rollers adjacent said shaft on the under side of said sub-frames, driving means connecting the rollers with the shaft and arranged to drive the rollers in opposite directions, other grooved rollers spaced along the sub-frames on the under sides thereof, supporting means for said other rollers and connected with respective said sub-frames, the supporting means lying substantially wholly above the planes of rotation of the rollers, and endless elastic belts with stretches adjacent and parallel to each other, guided and supported by said grooved rollers of respective sub-frames.

5. A plant harvester comprising a frame adapted to be moved in a forward direction and carrying a transverse horizontal drive shaft, elongated rigid sub-frames pivoted individually on the drive shaft, paired rollers spaced along the sub-frames, one element of each pair being on a different sub-frame, means drivingly connecting one pair of rollers to the shaft for rotation of the rollers of said pair in opposite directions, flexible belts carried by the rollers of each sub-frame, resilient means connected to said sub-frames and urging the frames toward each other, and longitudinally and laterally adjustable means on end portions of the sub-frames lying remotely of the drive shaft for carrying the pair of rollers most remotely of the drive shaft.

6. In a harvester of the type having elongated flexible endless belt couples operable along a contacting plane to grip plants between them and elevate the plants, and having rigid elongated frames extending parallel to the belts with means to guide the belts; shoe members attached to the portions of the frames which are adjacent to the plant-receiving bight portions of the belts and having, respectively, upper forwardly extending plant-gathering rod portions curving outwardly in opposite directions away from the contacting plane of the belts and having, respectively, runner or skid rod portions extending under the forward portions of respective belts, the shoes being of substantially entirely open construction so that soil can pass easily therethrough vertically and laterally.

7. The arrangement according to claim 6, characterized by the provision of clamping means to secure the shoe members to the frames, which clamping means is so constructed and arranged that the portions of the shoe members lying remotely of the belts can be swung toward and away from the contacting plane of the belts and locked in various adjusted positions.

8. In a harvester of the type having forwardly extending and downwardly inclined elongated belt couples in common planes for gripping and elevating plants; ejector members at the discharge portions of the belts and lying sufficiently close to return portions of the belts to clear the same of plants which adhere to the belts, and flexible bristle elements on the ejector member in said plane of the belts at the upper terminal portions of the belt loops.

9. In a plant harvester of the type having forwardly extending and downwardly inclined belt couples for pulling and elevating plants, and means to convey the plants, when elevated, to one side of the harvester, a rack for containers extending longitudinally of the harvester and means on the rack to guide containers serially into plant-receiving relation to the conveying means.

10. The arrangement according to claim 9 wherein said rack comprises a downwardly and rearwardly inclined roller track on which the containers are moved rearwardly to plant-receiving position by gravity.

11. The arrangement according to claim 9 wherein said rack comprises a roller equipped, downwardly and rearwardly inclined track on which the containers are moved to plant-receiving position by gravity and there is a releasable abutment for engaging the rearmost container, whereby it can be released from the track when filled.

12. A movable harvester implement, comprising a gang of forwardly extending and downwardly inclined puller belt couples and supporting and driving means therefor, a selectively reversible lateral conveyor in receiving relation to plants delivered by the belt couples, and longitudinally extending roller-equipped tracks at each side of the implement and carried thereby as the same is moved, said tracks being adapted to support containers for receiving plants from the lateral conveyor.

13. A root crop harvester comprising a wheeled supporting frame, a puller belt couple on the frame, elongated sub-frame means pivotally mounted at one end on the supporting frame and extending forwardly in downwardly inclined relation to the pivot axis for carrying the belt couple, and a wheeled carrier for the free end of the sub-frame means comprising a forwardly extending arm pivotally mounted at its rear end on the sub-frame means and carrying a wheel at its forward end, and adjustable means additionally connecting the arm to the sub-frame means intermediately of the ends of the arm.

14. A plant harvester comprising a frame adapted to be moved forwardly over a crop to be harvested, a pair of elastic compressible endless belts on the frame in a common plane inclined upwardly and rearwardly relative to the crop and arranged to engage top portions of such crop so as to pull and elevate the crop, parallel rigid bars fixedly pivoted adjacent the upper end portions of the belts to the frame on upright axes perpendicular to the plane of the belts, double flanged wheels spaced along and depending below the bars to support and guide the respective belts, and supporting means on the bars for the wheels, said supporting means lying substantially wholly above said plane, whereby the belts can be readily mounted on the supporting and guiding wheels by stretching the same over the lower flanges of the wheels from below the bars and wheels.

15. In a harvester of the type having a gang of forwardly extending and downwardly inclined belt couples for gripping and elevating plants, a main drive shaft extending over the rearward portions of belts, driving connections between the shaft and the belts, a substantially horizontal lateral belt conveyor in plant-receiving relation to the belt couples, and means including a reverse drive gearing at one end of the shaft for driving the conveyor selectively in opposite directions.

JOHN H. BALAZS.
RALPH F. BOTT.